United States Patent [19]

Holtey et al.

[11] 4,405,979
[45] Sep. 20, 1983

[54] DATA PROCESSING SYSTEM HAVING APPARATUS IN A COMMUNICATIONS SUBSYSTEM FOR ESTABLISHING BYTE SYNCHRONIZATION

[75] Inventors: Thomas O. Holtey, Newton; Steven S. Noyes, Boylston; James C. Raymond, Framingham, all of Mass.

[73] Assignee: Honeywell Information Systems Inc., Waltham, Mass.

[21] Appl. No.: 194,495

[22] Filed: Oct. 6, 1980

[51] Int. Cl.³ .............................................. G06F 3/04
[52] U.S. Cl. .................................................. 364/200
[58] Field of Search ............................. 364/200, 900

[56] References Cited

U.S. PATENT DOCUMENTS

| | | | |
|---|---|---|---|
| 3,680,051 | 7/1972 | Blessin et al. | 364/200 |
| 3,825,905 | 7/1974 | Allen | 364/200 |
| 4,122,519 | 10/1978 | Bielawski et al. | 364/200 |
| 4,156,931 | 5/1979 | Adelman et al. | 364/900 |
| 4,188,665 | 2/1980 | Nagel et al. | 364/200 |
| 4,225,919 | 9/1980 | Kyu et al. | 364/200 |
| 4,254,462 | 3/1981 | Raymond et al. | 364/200 |

*Primary Examiner*—Mark E. Nusbaum
*Assistant Examiner*—Michael R. Fleming
*Attorney, Agent, or Firm*—Nicholas Prasinos

[57] ABSTRACT

A data processing system having a communications subsystem operating in a byte control protocol mode includes apparatus for establishing byte synchronization between the data circuit terminating equipment (DCE) and the communications subsystem. The apparatus includes a flop for receiving a stream of predetermined binary bits, a counter generating count signals indicative of the number of binary bits between a byte timing signal from the DCE and the last binary ONE bit of the last byte containing all binary ONE bits, a shift register for the serial shifting of the transmitted data bits and a multiplexer responsive to the count signals for selecting the shift register terminal, thereby timing the byte timing signal to the binary bit stream of data bits, including bytes of all binary ONE bits and a byte of all binary ZERO bits, followed by bytes of data bits.

7 Claims, 4 Drawing Figures

- - - CONTROL

DATA PROCESSING SYSTEM HAVING APPARATUS IN A COMMUNICATIONS SUBSYSTEM FOR ESTABLISHING BYTE SYNCHRONIZATION

BACKGROUND OF THE INVENTION

1. Field of the Invention

This invention pertains to a communications controller in a data processing system and more particularly to apparatus for synchronizing a stream of data bits transmitted from the communications controller to a device in a byte control protocol mode with a byte timing signal generated in the device.

2. Description of the Prior Art

Highly flexible and cost effective communication line adapters have been provided for coupling data processing systems to communication channels such as those associated with a publicly accessible, e.g., telephone, communications network. Such systems have been embodied in hardware/firmware architectures which respond to commands from a communication processor associated with a central processing unit and enter into either a receive mode, a transmit mode, or concurrent transmit/receive modes for transferring data messages between the communication processor and the communication channel. Data transfers occur under the control of a firmware system acting in concert with a microprocessor within the adapter to assemble and disassemble whole or partial data bytes of varying bit sizes. System architectures which have been used readily accommodate an expansion of capacity and exhibit dynamic flexibility.

Communication line adapter systems are required to interface with a synchronous communications network such as, for example, has been specified by the International Telegraph and Telephone Consultative Committee (CCITT) and described in the "CCITT Sixth Plenary Assembly—Orange Book, Vol. VIII.2 Public Data Networks", published in 1977 by the International Telecommunication Union, Geneva. Various specifications, in particular those designated X.21, X.24 and X.27, promulgated by the CCITT call for generation within the data network of bit and byte timing signals which are used for establishing a byte control protocol (BCP) or a bit oriented protocol (BOP) for organizing and handling data messages.

U.S. application Ser. No. 053,110 which was abandoned May 29, 1981 entitled, "Communication Line Adapter For a Bit and Byte Synchronized Data Network" describes a communication adapter that supports the BCP mode of communication.

In the BCP mode the device generates a byte timing signal and a sequence of bit timing signals. The transmission of data bits from the adapter to the device is synchronized with the byte timing signal in a microprocessor in the adapter by means of a firmware routine stored in a memory in the adapter. In addition, hardware in the adapter under control of the microprocessor assembles the data bits of the byte and transmits the data bits to the device synchronized to the byte timing signal.

However, present day communications subsystems have a requirement to operate with many types of communications devices such as dialing units, MODEMs, touch tone receivers, cathode ray tube displays, remote printers, etc. The prior art adapters require modification for communicating with the various devices, each of which has a different mode of control.

Accordingly, a communications controller having a common logic section for handling all kinds of communications devices and individual adapter boards for controlling each device was required. This made the byte synchronization approach of the prior art systems unwieldy. The microprocessor in the common logic section would have difficulty in keeping up with the throughput requirements of the multitude of devices. A microprocessor with its associated logic into the individual adapter board would be inordinately expensive to design, manufacture and support in the field.

OBJECTS OF THE INVENTION

It is therefore an object of the present invention to provide an improved communications subsystem.

Another object is to provide synchronization apparatus to enable the coupling of a central processing unit to a synchronous data communications network.

A further object is to provide a communications subsystem having byte synchronization apparatus enabling the communications subsystem to transmit data to the device in a byte control protocol (BCP).

Still a further object is to provide a communications subsystem having the byte synchronization apparatus designed into an individual adapter board coupled to a particular device.

SUMMARY OF THE INVENTION

To achieve the foregoing objects, a communications subsystem is coupled to a system bus. Also coupled to the system bus are a central processor subsystem and a memory subsystem. A number of devices are coupled to a communications controller through individual flexible line adapter packages (FLAPs). The communications controller and the FLAPs are included in the communications subsystem.

The communications controller includes a microprocessor, a random access memory (RAM), a programmable read only memory (PROM), and universal synchronous receiver transmitters (USRTs). The microprocessor controls the communications procedure under direction of systems software stored in RAM and communications firmware stored in PROM. The USRTs communicate with the devices to transmit and receive bytes of information coded in a serial manner through a device FLAP.

When the device is operative with the communications controller in a byte control protocol mode of operation, the device generates a byte timing signal X21B±1X and a stream of bit timing signals X21S±1X which are received by the communications controller.

During the transmission of data bits to the device, apparatus in the FLAP synchronizes the stream of data bits with the byte timing signal to enable the device to assemble the data bits into bytes. The byte timing signal is synchronous with the data bit timing signals but asynchronous with the byte; that is, it may be timed to any particular data bit in the byte, but it remains timed to the particular data bit for the duration of the transmission.

The apparatus in the FLAP for synchronizing the byte timing signal to the byte includes a flop, a binary counter, a shift register and a multiplexer.

The microprocessor generates a fixed bit pattern of bytes containing all binary ONE bits followed by a byte containing all binary ZERO bits which is transmitted to the FLAP. The flop sets when receiving binary ONE bits and resets when receiving binary ZERO bits.

The counter counts the number of data bit timing signals received when the flop is set. The counter is reset by the byte timing signal. The counter will store an indication of the number of binary ONE bits received by the counter for the time period between receiving the byte timing signal and the first binary ZERO bit of the byte containing all binary ZEROs.

The flop output is applied to the shift register. The data bits are shifted at the bit timing signal rate. The parallel outputs of the shift register are applied to inputs of the multiplexer. The count stored in the counter selects the multiplexer input that is operative and the data bits are transmitted to the device from the shift register output coupled to the selected multiplexer input. This synchronizes the last binary bit of a byte to the byte timing signal.

DESCRIPTION OF THE PREFERRED EMBODIMENT

Figure 1:
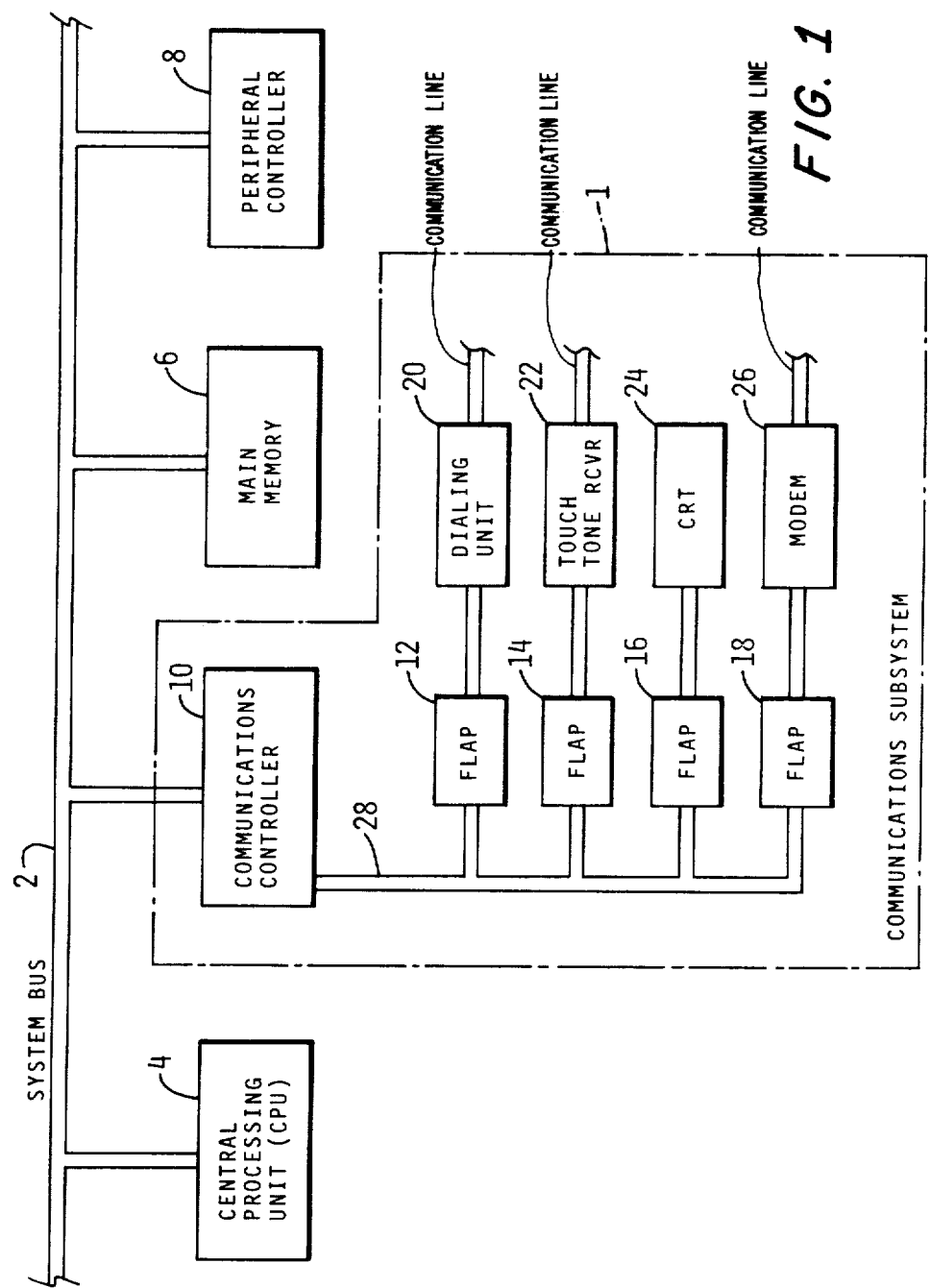
FIG. 1 is a block diagram of the data processing system including the communications subsystem.

FIG. 1 is a block diagram of a typical system. It includes a central processor unit (CPU) 4, a main memory 6, a peripheral controller 8, and a communications controller 10, all coupled in common to a system bus 2. The communications subsystem 1 includes the communications controller 10 and a number of units coupled to the communications controller 10 by a bus 28. This includes a number of flexible line adapter packages (FLAPs) 12, 14, 16 and 18. Coupled to FLAP 12 typically could be a dialing unit 20. Coupled to FLAP 14 typically could be a touch-tone receiver 22. Coupled to FLAP 16 typically could be a cathode ray tube (CRT) display 24. Coupled to FLAP 18 typically could be a modem 26.

The communications subsystem 1 receives information from devices, typically the touch-tone receiver 22 and the modem 26, through FLAPs 14 and 18 respectively. The information is transferred over bus 28 to communications controller 10. The information is stored via system bus 2 in main memory 6.

The communications subsystem 1 sends information to devices, typically the dialing unit 20, the CRT 24 and the modem 26. The information is sent to FLAPs 12, 16 and 18 from main memory 6 via communications controller 10 and system bus 2.

The CPU 4 has overall control of the communications subsystem 1 execution and performance. The CPU 4 accomplishes this by transferring configuration and control information via system bus 2 for storage in the communications controller 10. This information includes channel control programs (CCP), communication control blocks (CCB), and line control tables (LCT). The CCP, CCB and LCT operations are described typically in U.S. Pat. No. 4,133,030 entitled "Control System Providing for the Transfer of Data in a Communications Processing System Employing Channel Dedicated Control Blocks".

Figure 2:
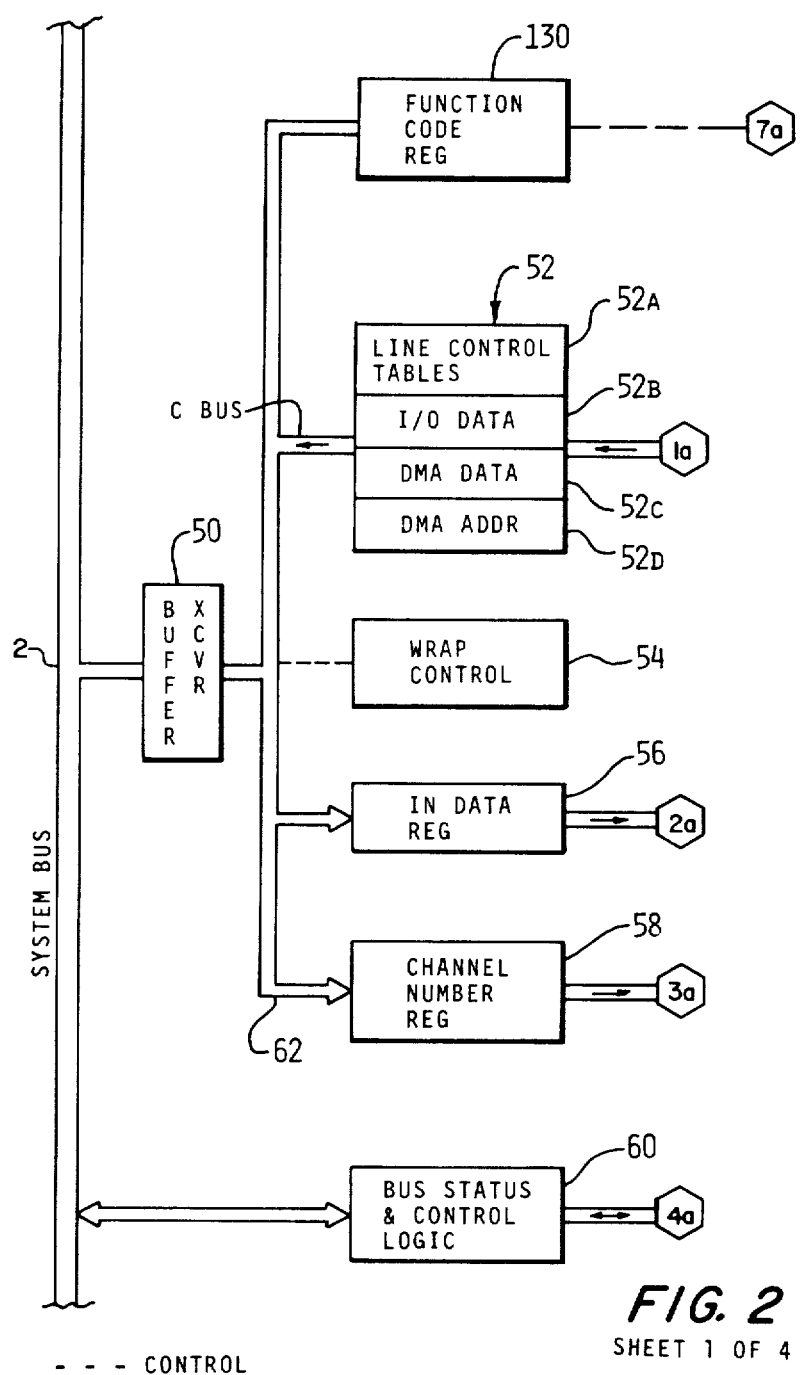
FIG. 2 is a block diagram of the communications subsystem.
Figure 2:
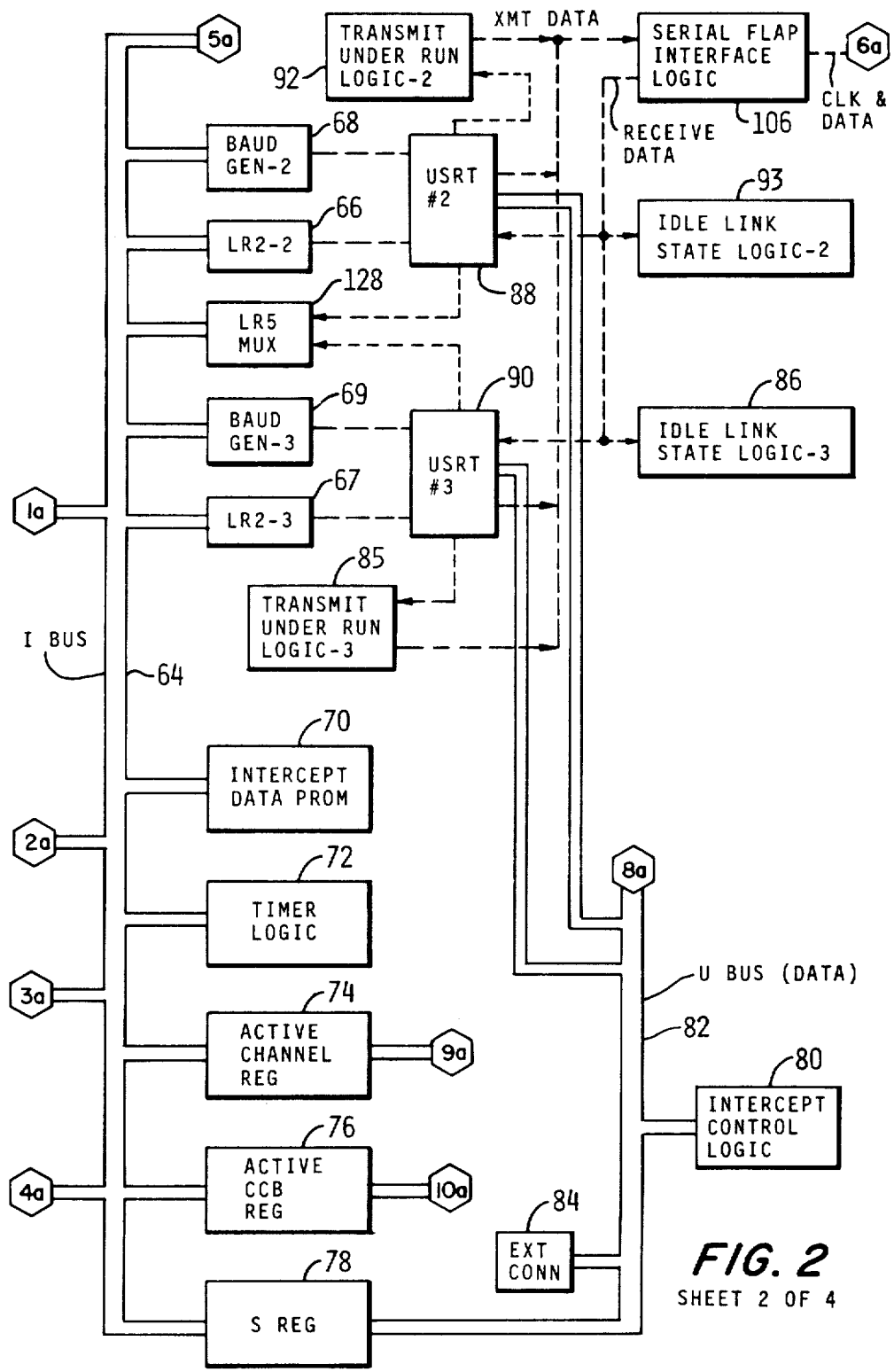
Figure 2:
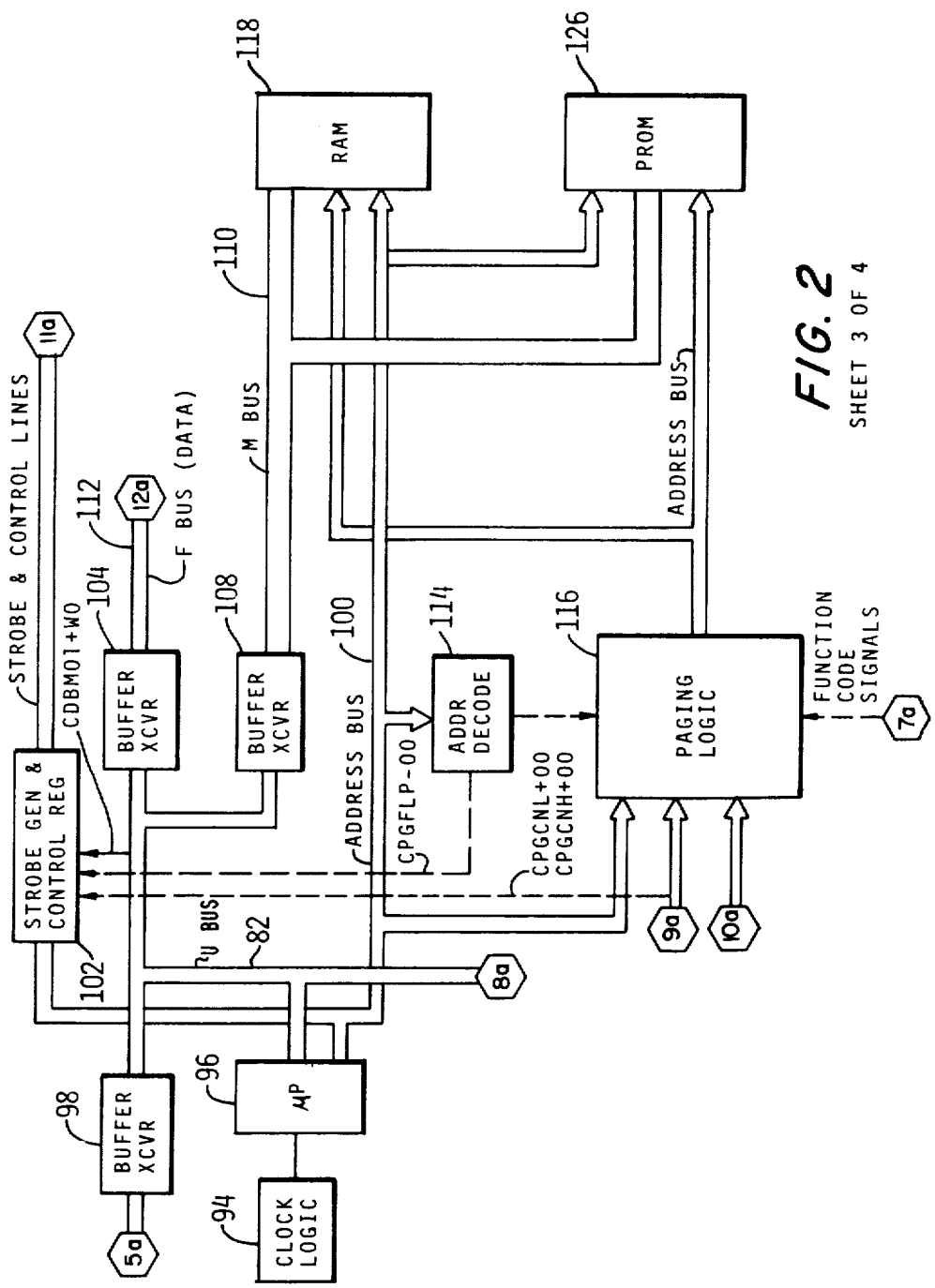
Figure 2:
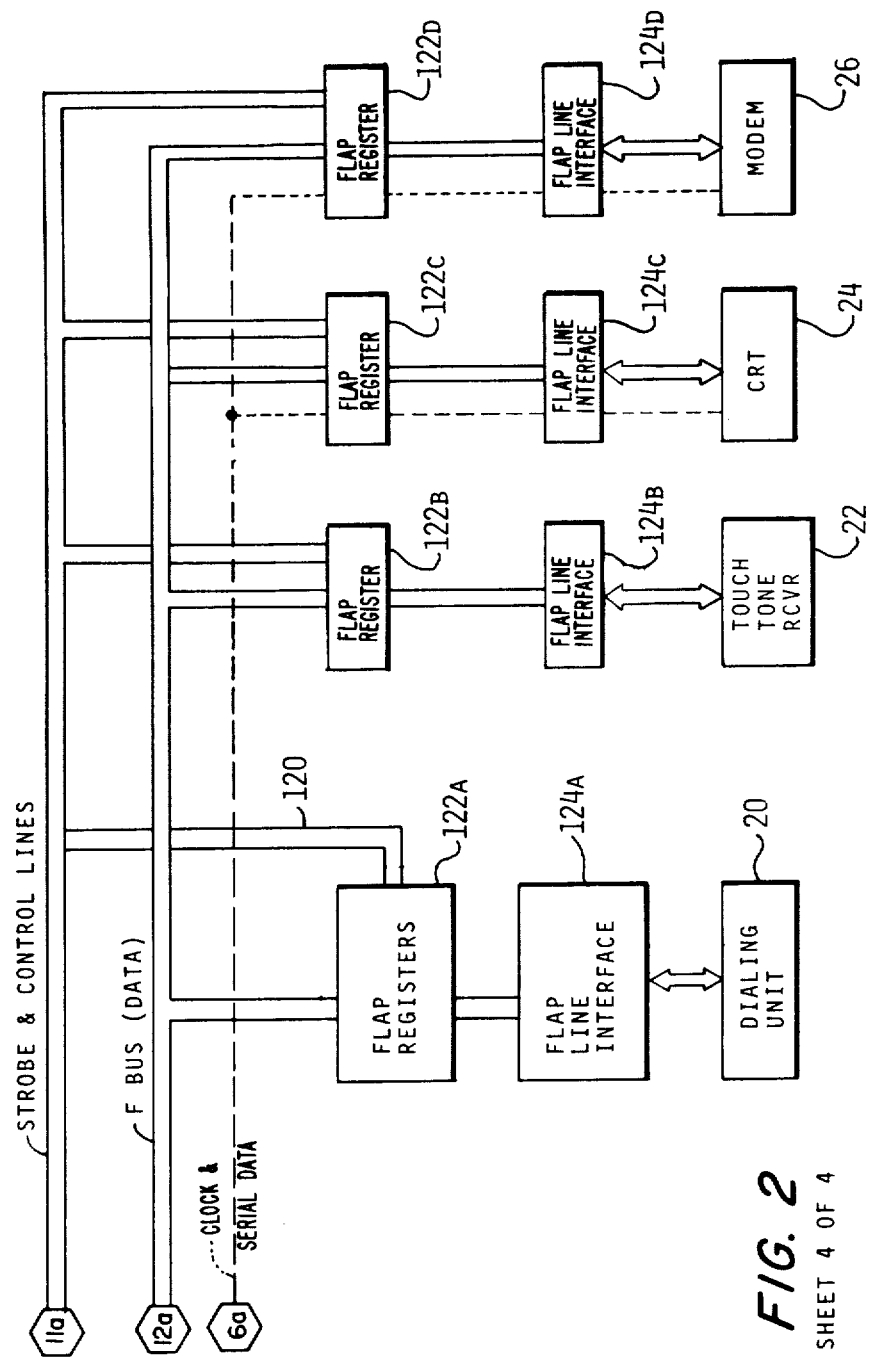

FIG. 2 shows a block diagram of the communications subsystem 1 including the communications controller 10 and the FLAPs 12, 14, 16 and 18. Information is received by communications controller 10 from main memory 6 via system bus 2, a transceiver 50, C bus 62, and is stored in an in-data register 56 under control of bus and status logic 60. Bus and status logic 60 is described in U.S. Pat. No. 4,293,908 which issued Oct. 6, 1981 entitled, "Data Processing System Having Direct Memory Access Bus Cycle". Information is transferred to the system bus 2 via a random access memory (RAM) 52, C bus 62 and transceiver 50.

Information may be routed from RAM 52 to in-data register 56 since transceiver 50 is capable of isolating the C bus 62 from system bus 2 during a wrap-around operation. RAM 52 contains four 16-bit registers, an interrupt data register 52a, an input/output data register 52b, a direct memory access (DMA) register 52c and a DMA address register 52d.

The interrupt data register 52a stores the channel numer of the CPU 4 and the interrupt level of the information received by the communications subsystem 1 for transfer to main memory 6.

The CPU 4 channel number on system bus 2 indicates that this system bus 2 cycle contains information for the CPU 4.

The input/output data register 52b stores information, status or device identification, in response to a CPU 4 input request. The DMA data register 52c stores the information that is to be written into main memory 6.

The DMA address register 52d stores the main memory 6 address location into which the information stored in DMA data register 52c is to be written. The DMA address register 52d may also store the main memory 6 address location of the information requested by communications controller 10.

A channel number register 58 receives the channel number of all system bus 2 input/output cycles. The bus status and control logic 60 compares the channel number stored in manual switches with the channel number present on the system bus 2. An equal comparison indicates that this system bus 2 cycle is addressing communications subsystem 1. The channel number register 58 is then used to store the channel number present on the system bus 2. A function code register 130 stores the function code received from the system bus 2. The function code indicates to the communications subsystem 1 the input/output function the communications controller 10 is to perform.

A microprocessor 96 controls the operation of the communications controller 10. The microprocessor 96 communicates with the system bus 2 via a U bus 82, a transceiver 98, I bus 64, RAM 52 for sending data to the system bus 2; and in data register 56 for receiving data from the system bus 2, and transceiver 50. Microprocessor 96 generates address signals which are sent over an address bus 100.

Also coupled to U bus 82 are universal synchronous receive/transmit receivers USRT-2 88 and USRT-3 90 communication interfaces. Associated with USRT-2 88 is a baud rate generator BAUD-2 68 and an LR2-2 register 66. Associated with USRT-3 90 is a baud rate generator BAUD-3 69 and an LR2-3 register 67. BAUD-2 68 and BAUD-3 69 receive signals from I bus 64 to specify the baud rate for the devices directly connected to communications subsystem 1, and also indicates to USRT-2 88 and USRT-3 90 respectively, the baud rate for transmission to an external device. USRT-2 88 and USRT-3 90 are described in "Signetics Multi-Protocol Communications Circuit (MPCC/SDLC) 2652" printed in March 1978 by the Signetics Corporation, 811 East Arques Avenue, Sunnyvale, Calif. 94086.

The LR2-2 register 66 and LR2-3 register 67 store signals from I bus 64 for controlling such operations as clear, idle link state, transmit-on, receive-on, and loop modes of USRT-2 88 and USRT-3 90 respectively.

An LR5 multiplexer 128 receives output status signals indicating transmit underrun, byte available, status available, and idle link state from USRT-2 88 or USRT-3 90 for transfer to I bus 64.

Intercept data programmable read only memory (PROM) 70 is addressed by channel number signals selecting a particular communication channel in communications subsystem 1 and also addressed by signals indicating that the USRT-2 88 or the USRT-3 90 has generated a data service request. An intercept signal from PROM 70 is applied to intercept control logic 80. Microprocessor 96 queries intercept control logic 80 for the interrupt signal. Microprocessor 96 is responsive to the intercept signal to receive the remaining PROM 70 signals identifying the interrupting unit for processing the particular communication channel.

A channel register 74 is associated with the paging operation which is described infra. Channel register 74 is loaded by microprocessor 96 through U bus 82, transceiver 98, and I bus 64 with information indicating which communication channel is operative. Signals CPGCNL+00 and CPGCNH+00 are provided to the strobe generator and control register 102 for generating FLAP stores and storing the direct connect, clear to send and protocol modes of operation.

A random access memory (RAM) 118 stores channel control programs (CCP), communication control blocks (CCB) and line control tables (LCT). This information is loaded into RAM 118 from main memory 6, via system bus 2, transceiver 50, C bus 62, in data register 58, I bus 64, transceiver 98, U bus 83, a transceiver 108, and an M bus 110 to RAM 118. This is accomplished by microprocessor 96 generating appropriate address locations which are transferred to RAM 118 via address bus 100 and paging logic 116.

The communications controller 10 continually scans the communication lines from FLAPs 12, 14, 16 and 18 for any activity. Upon detection of a receive channel activity, the receive CCPA for that channel is initiated. Under CCP control the communications controller 10 analyzes the assembled receive data byte, performs any required checks, updates the LCT status and CCB control progress, and delivers the data byte to main memory 6. The CCP terminates after each completed transfer to main memory 4, or when interrupted by a higher priority channel.

The CCB area of RAM 118 provides information on each communication line in a transmit mode and each communication line in a receive mode. The information includes a main memory 6 address location of the next data byte to be stored or read. The information further includes a count of the number of bytes remaining for transfer between the communications controller 10 and main memory 6, and the final status of the communication line. The final status includes error information, data set status (e.g. modem 26), interrupt status, and whether the CCB program has been executed and the status is complete.

The LCT area of RAM 118 stores receive and transmit configuration, context and control information for each communication line. Included are firmware work locations, CCP work locations, receive transmit character length information, a CCP pointer, data byte storage, status information and interrupt level information.

A CCB active register 76 stores information indicating which of the four communication lines is active, and whether the communication line is in a receive or transmit mode. The output of the CCB active register 76 is available to the microprocessor 96 through the paging logic 116.

An S register 78 allows the microprocessor 96 to perform an indirect addressing function by storing an address in the S register 78. This address replaces an address stored in a PROM 126 address location.

PROM 126 stores the firmware routines which are operative with the microprocessor 96. Address information is sent from microprocessor 96 to PROM 126 via address bus 100 and paging logic 116. A microword read from PROM 126 is sent back to the microprocessor 96 via the M bus 110, transceiver 108 and U bus 82.

The microprocessor 96 communicates with the CPU 4 and the main memory 6 over system bus 2 as well as the USRT-2 88 and USRT-3 90 through the firmware routines stored in PROM 126 and the software channel program routines stored in RAM 118.

It is necessary to match the speed of microprocessor 96 with the speed of the logic and memory units. This is accomplished through a clock logic 94 unit. The microprocessor 96 normally runs at a 500 nanosecond or two megahertz clock rate. However, when the microprocessor 96 communicates with the USRT-2 88 and USRT-3 90 or FLAP 122a, 122b, 122c or 122d logic, the clock logic 94 phase 1 and phase 2 timing signals are slowed to a 1600 nanosecond or 0.625megahertz clock rate. The clock logic 94 outputs a number of clock phase signals in each microprocessor 96 phase 1 and phase 2 cycles. The phase 1 and phase 2 cycles are stretched to enable additional clock phase signals to control the FLAP 122a–d logic.

When USRT-2 88 is in a transmit (bit oriented protocol) mode, and the next data byte is not provided to the USRT-2 88 in time to provide a continuous stream of bits to the receiving station, then a transmit underrun unit 92 conditions the USRT-2 88 to transmit a series of binary ONEs indicating to the receiving station that the message was aborted. The data bytes are sent to a device via serial FLAP interface logic 106 and a FLAP line interface 124c or 124d.

An idle link state unit 93 is also coupled to the USRT-2 88. When the USRT-2 88 is in a receive (bit oriented protocol) mode, the sending station places the line in an idle state by sending 15 binary ONE bits on the line. The idle link state unit 93 detects the 15 binary ONE bits and informs the microprocessor 96 that the line is in an idle link state via LR5 MUX 128. The microprocessor 96 responds to the 15 successive binary ONE bits to abort the message sent by the sending station and look for a new message.

A transmit underrun unit 85 and an idle link state unit 86 are coupled to USRT-3 90 to perform the transmit underrun operation and receive idle link state operation for that communication channel.

An address decode 114 unit receives address signals from the microprocessor 96 via address bus 100 and generates control signals which perform a number of functions, typically activating the stretch cycle of clock logic 94, enabling certain registers to store information from the various buses, enabling a strobe generator and control register logic 102 by means of signal CPGFLP-00, and enabling USRT-2 88 and USRT-3 90.

The strobe generator and control register logic 102 is responsive to address signals received over address bus 100 for generating separate strobe signals for FLAP registers 122a, 122b, 122c and 122d as well as control signals which are enabled at the respective FLAP registers 122a-d by the particular strobe signal. Stored are bits indicating the direct connect, clear to send and protocol modes of operations.

An external connector 84 is provided for testing purposes. It allows test equipment to be connected to U bus 82 to exercise the communications controller 10 through firmware test routines applied externally. PROM 126 may be disabled for certain test sequences.

A paging logic 116 unit in conjunction with the channel register 74 and the CCB active register 76 allows the microprocessor 96 to be operative with the eight communication channels using a single firmware set of routines. Associated with each communication channel is a block of CCB software. The paging logic allows the same set of firmware routines to process each CCB program. Similarly, the LCTs are organized by communication line. The paging logic 116 allows a single firmware routine to be operative with each communication line.

Data is transferred between the U bus 82 and the FLAPs 122a-d via F bus 112 and a transceiver 104.

Figure 3:
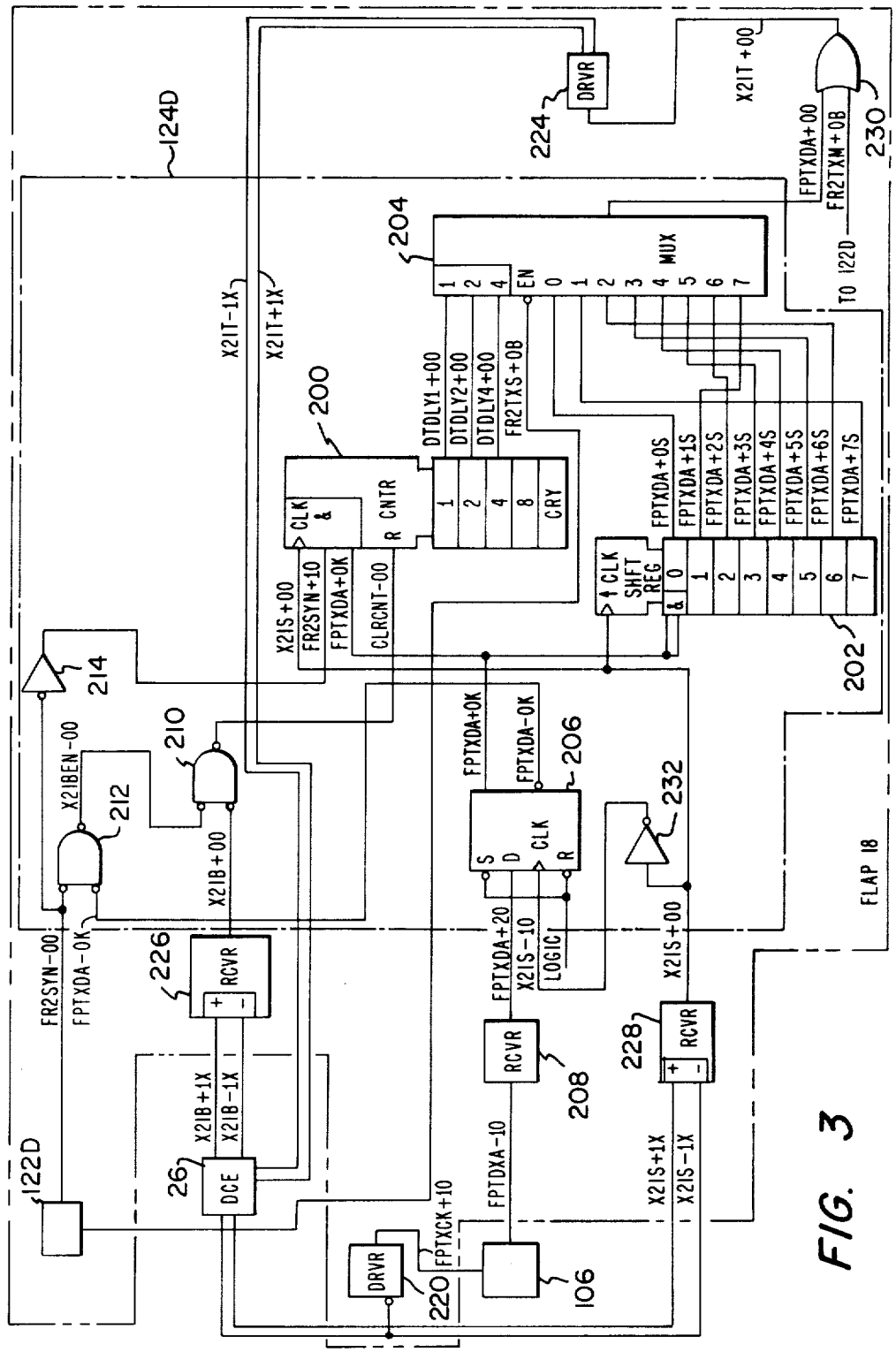
FIG. 3 is a logic diagram of the logic for synchronizing the byte timing signal to the binary bit stream.

Referring to FIG. 3, signals X21B±1X and X21S±1X are generated by the MODEM Data Circuit-Termination Equipment—DCE 26 and received by the FLAP 18. The DCE 26 receives signals X21T±1X from driver 224 in FLAP 18. The binary data signals originating in the communications controller 10 are transmitted to the DCE 26 via signal lines X21T±1 X.

Signals X21S±1X provide the timing signals to the FLAP 18 to clock the binary data signals X21T±1X. Timing signal X21S−1X is also applied to serial FLAP interface 106 through a driver 220 as signal FPTXCK+10 to clock the transmit data from the USRT-3 90. The logic associated with signal FPTXCK+10 is not described further since it is not pertinent to this invention.

Signals X21B±1X indicate the byte timing of the binary data transmitted via signal lines X21T+1X by forcing the output signal X21B+00 of a receiver 226 to logical ZERO for the last binary bit of the byte received by DCE 26 from the communications controller 10.

Binary data bits are received from serial FLAP interface logic 106 and applied to the D input terminal of a flop 206 via data signal FPTDXA-10 and a receiver 208 and signal FPTDXDA+20. Timing signal X21S+10 is applied to the clock terminal CLK of flop 206 which is set for binary ONE data bits and reset for binary ZERO data bits.

Communications controller 10 sends 3 bytes of binary bits generated by microprocessor 96 via USRT-2 88 or USRT-3 90 serial FLAP interface 106 and signal FPTDXA-10. All 8 bits of the first and second bytes contain binary ONE bits and all 8 bits of the third byte contain binary ZERO bits. This enables the FLAP line interface logic 124D to identify the last bit position of the bytes received from the communications controller 10 and store a count in a counter 200 of the number of binary bit positions between that last bit position of the byte and the byte timing signal X21B+00 in order to establish byte synchronization. It is necessary to establish byte synchronization between communications controller 10 and DCE 26 since it is a requirement that DCE 26 receive bytes in accordance with the pulses of signal X21B+00. The USRT-2 88 generates a stream of bytes asynchronous to the pulses of signal X21B+00. The synchronization logic establishes a timing relationship between communications controller 10 and DCE 26.

A FLAP synchronization signal FR2SYN+10 is at logical ONE as is the data signal FPTXDA+0K, the flop 206 output, when the communications controller 10 sends byte containing binary ONE bits to FLAP 18. Signal FR2SYN-00 at logical ZERO from FLAP register 122D is inverted by an inverter 214.

Counter 200 therefore counts the number of synchronization signals X21S+00 received when the FLAP 18 receives the first and second bytes of binary ONE bits.

Signals FR2SYN-00 and FPTXDA-0K at logical ZERO are applied to a NAND gate 212 forcing the output enable signal X21BEN-00 to logical ZERO. When the byte timing signal X21B-00 at logical ZERO is applied to a NAND gate 210, the output signal CLRCNT-00 is formed to logical ZERO, clearing counter 200 to binary 000. The first binary ZERO bit of the third byte received by FLAP 18 resets flop 206 thereby preventing counter 200 from incrementing. The counter 200 now stores the number of binary ONE bits received over signal FPTXDA+0K after the byte timing signal X21B+0B was received. This bit count is applied to a MUX 204 over signal lines DTDLY1+00, DTDLY2+00 and DTDLY4+00 and selects a MUX 204 input terminal 0 through 7.

The stream of binary bits received through flop 206 is shifted through a shift register 202 on the rise of timing signal X21S+00. The output signal FPTXDA+0S through +7S are applied to the input terminals 0, 7 through 1 of MUX 204. The appropriate MUX 204 input terminal is selected to time the byte timing signal X21B±1X to coincide with the last binary bit of the previous byte.

The MUX 204 output signal FPTXDA+00 is applied to the DCE 26 via an OR gate 230 and a driver 224 through signals X21T+00 and X21T±1X. The FR2TXM+0B signal generated by the communications controller 10 is applied to OR gate 230 and provides binary ONE signals to the DCE 26 during the time the FLAP line interface 124D is establishing the count as described supra. This indicates to the DCE 26 that the communications connection is established.

Figure 4:
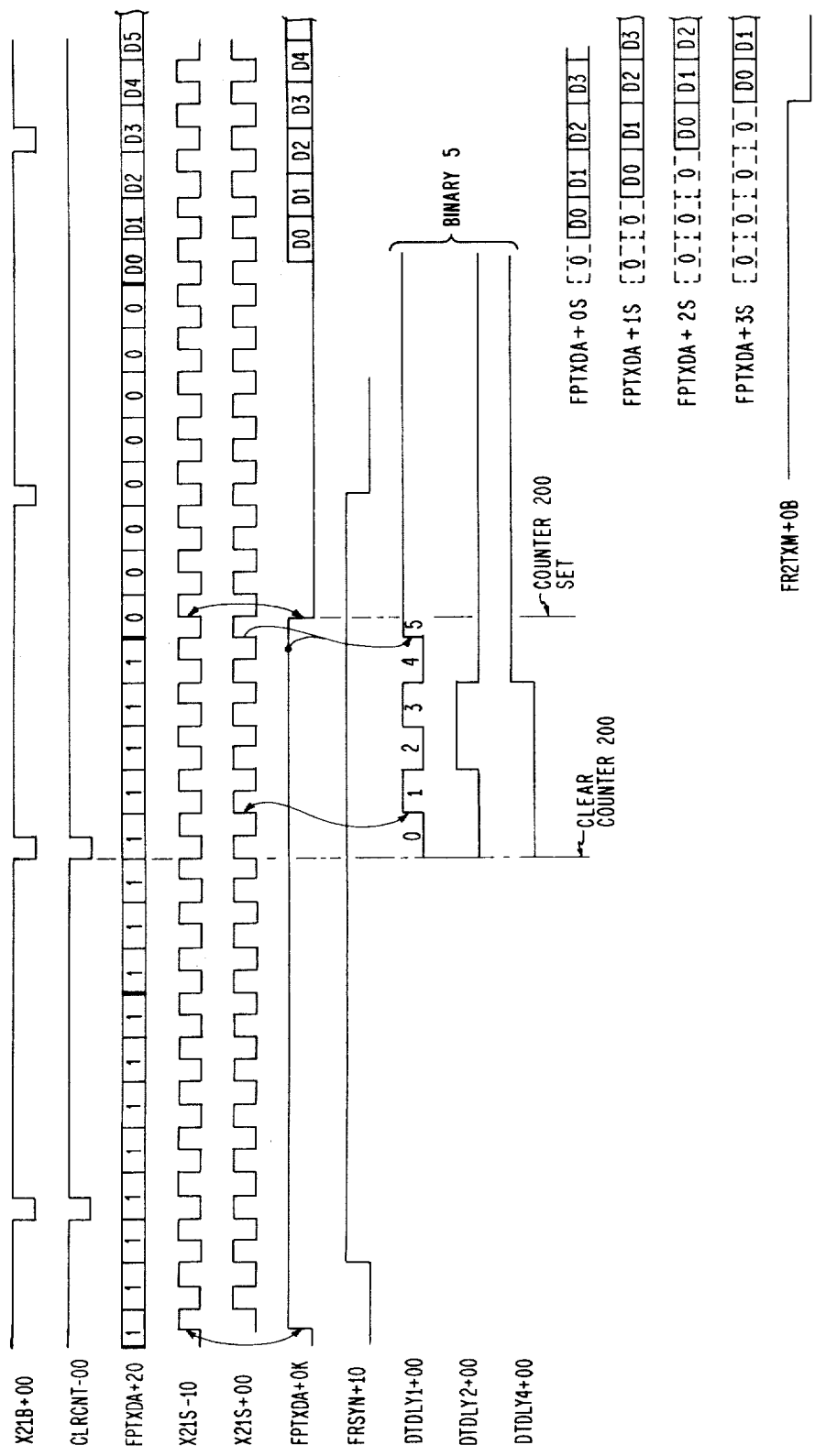
FIG. 4 is a timing diagram of the synchronization logic.

The timing diagram, FIG. 4, shows how a typical example is handled by the logic. Assume the timing of byte timing signal X21B+00 as shown; forced low for one-half of a timing cycle on the rise of each eighth timing signal X21S+00. Two data bytes of 8 binary ONE bits and a data byte of 8 binary ZERO bits are received over signal FPTXDA+20 and conditions flop 206 to be set on the rise of timing signal X21S+00 when the first binary ONE bit is received and reset on the rise of timing signal X21S+00 when the first binary ZERO bit is received. The clear count signal CLRCNT-00 clears counter 200 which then starts to count the rise of timing signal X21S+00 when data signal FPTXDA+0K is high. For the example shown, the outputs of counter 200, signals DTDLY1+00, DTDLY2+00 and DTDLY4+00, indicate a count of binary 5. D1, D2, D3, etc. indicate the binary bits of the first information byte. The count of binary 5 applied to MUX 204 selects input terminal 5. The data bits D0, D1, D2, D3, etc. are shifted through shift register 202 and exit on signal line FPTXDA+3S, through MUX 204, and through OR gate 230 and driver 224 to DCE 26. Signal line FPTXDA+3S, FIG. 4, shows the byte timing signal X21B+00 occurring during the time the last binary bit of the previous byte appears on signal line FPTXDA+3S.

Signal FRSYN+10 when high enables counter 200 and gates the byte timing signal X21B+00 on the CLRCNT+00 signal line for clearing counter 200.

Signal FR2TXM+0B when high causes a stream of binary ONEs to be sent to DCE 26 to maintain the connection with communications controller 10.

DCE 26 and FLAP were arbitrarily selected to describe the synchronization logic. The synchronization logic is also applicable to DCEs 20, 22 and 24 and FLAPs 12, 14 and 16 respectively.

Having shown and described a preferred embodiment of the invention, those skilled in the art will realize that many variations and modifications may be made to affect the described invention and still be within the scope of the claimed invention. Thus, many of the elements will provide the same results and fall within the spirit of the claimed invention. It is the intention, therefore, to limit the invention only as indicated by the scope of the claims.

What is claimed is:

1. In combination with a communication line coupled to a communications subsystem, a data processing system comprising a system bus, at least one central processing unit (CPU), one main memory system, one peripheral controller and said communications subsystem, all coupled in common to the system bus, said communications subsystem including a communications controller coupled to said system bus, a plurality of flexible line adapters (FLAPs), each coupled to said communications controller, and further including typical communication devices such as a modem, a dialing unit, a touch-tone receiver, a cathode ray tube (CRT), a plurality of each of said typical devices coupled to one each of said FLAPs, an apparatus in said each of said FLAPs for establishing byte synchronization comprising:

(a) a U-bus and an M-bus coupled to each other, and further coupled to said system bus;

(b) a microprocessor (μP) coupled to said U-bus;

(c) a random access memory (RAM) coupled to said M-bus;

(d) a programmable read only memory (PROM) also coupled to said M-bus;

(e) a universal synchronous receiver (USRT) coupled to said U-bus for transmitting bytes of information read from said main memory to a selected one of said typical devices via said FLAPs, and receiving bytes of information from said selected one of said typical devices via said FLAPs for writing in said main memory, said bytes of information being transferred in a byte control protocol mode when one of said typical devices generates a sequence of byte timing pulses of which successive pulses are separated by one byte width; and (f) synchronizing means included in said FLAPs and coupled to said USRT and to said typical devices, said synchronizing means synchronizing said bytes of information to the sequence of byte timing pulses.

2. The apparatus as recited in claim 1 wherein said USRT transmits a stream of predetermined binary bits to said synchronizing means in byte format.

3. The apparatus as recited in claim 2 wherein said synchronizing means includes receiver means coupled to said USRT for receiving the predetermined stream of binary bits in byte format, wherein said predetermined stream of binary bits comprises two bytes of binary ONE bits followed by one byte of binary ZERO bits followed by a plurality of bytes of data bits.

4. The apparatus as recited in claim 3 wherein said synchronizing means includes counter means coupled to said receiver means for counting the number of binary ONE bits between the byte timing pulses and the last binary ONE bit of the predetermined stream of binary bits.

5. The apparatus as recited in claim 4 wherein said synchronizing means includes first means coupled to said counter means for immobilizing said counter means at a number digit indicating the number of binary bits between a selected one of the byte timing pulses and the last binary ONE bit of the second byte of binary ONE bits of the predetermined stream of binary bits.

6. The apparatus as recited in claim 5 wherein the data bits are also an identifier of one of said typical devices.

7. The apparatus as recited in claim 6 wherein said synchronizing means includes a shift register coupled to said receiver means, counter means, and muliplexer means for shifting the data bits into the multiplexer at an input terminal selected by signals indicative of the number digit and to one of said typical devices.

* * * * *